H. FISHER.
Knife for Cutting Hay and Cane.
No. 220,469.        Patented Oct. 14, 1879.
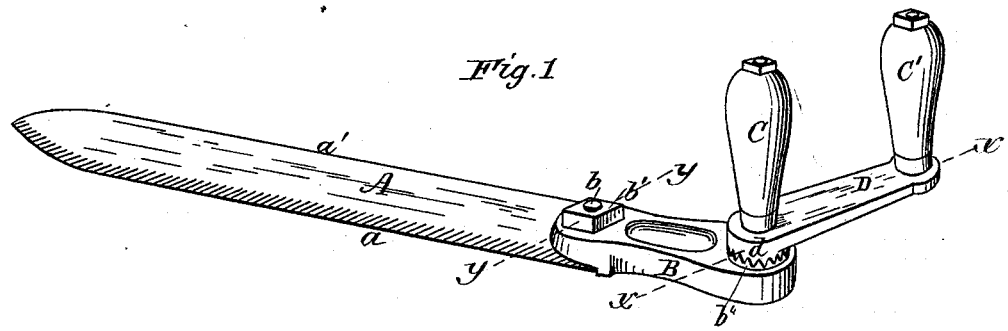
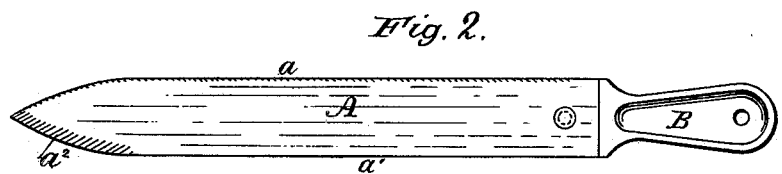
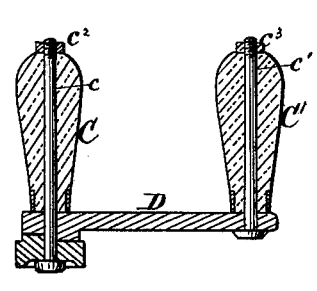 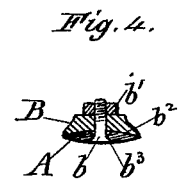
Witnesses:
E. E. Masson
A. H. Bliss
Inventor:
Henry Fisher
by H H Doubleday
atty

UNITED STATES PATENT OFFICE.

HENRY FISHER, OF CANTON, OHIO.

IMPROVEMENT IN KNIVES FOR CUTTING HAY AND CANE.

Specification forming part of Letters Patent No. 220,469, dated October 14, 1879; application filed January 15, 1879.

*To all whom it may concern:*

Be it known that I, HENRY FISHER, of Canton, in the county of Stark and State of Ohio, have invented certain new and useful Improvements in Devices for Cutting Hay and Cane; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of this invention is to furnish the farmer with an implement which may be used as a machete, a corn or cane cutter, and also as a hay or straw knife, and which shall possess certain advantages as a hay or straw knife not found in any implement of prior construction, as will be fully explained hereinafter.

Figure 1 is a side elevation of my improved cutter. Fig. 2 is an elevation taken from the opposite side. Fig. 3 is a section taken on line *x x*, Fig. 1. Fig. 4 is a section taken on line *y y*, Fig. 1.

In the drawings, A represents a two-edged cutting-blade. It is serrated upon one edge, as indicated at *a*, the other edge being smooth, as indicated at *a'*. While I prefer this construction of the edges, both sides may be serrated, if preferred, as the present invention does not depend upon the character of the edges of the blade.

B is the shank, to which the blade is attached by means of a bolt, *b*, and nut *b'*. One end of the shank B is rabbeted in such manner that when the blade A is attached thereto the face of the blade and the face of the shank shall be in the same plane, and the hole through the blade is countersunk upon both sides, so that the head of the bolt shall not project beyond the face of the blade, the result being that, whether the blade be placed in the position shown in the drawings, or be reversed, the head of the bolt and the face of the shank shall present a practically smooth and unbroken surface, which greatly facilitates the operation of the implement when it is used for cutting hay, it being readily understood by those who are familiar with such implements that its usefulness would be very much impaired in cutting hay from a stack or mow by anything which projected from that side of the shank B to which the blade is attached, or from that side of the blade which would catch against the cut ends of the hay or straw.

In order to conveniently manipulate the implement when used as a hay-knife, I have provided it with two handles, C C', and arm D. The arm D is provided at its inner end with a series of radial ribs or teeth, *d*, corresponding substantially to another series of ribs or teeth, $b^4$, formed upon the outer end of the shank B. The bolt *c* passes longitudinally through the handle C, the arm D, and the shank B.

Thus it will be seen that the handles C C' upon arm D project at a right angle from the plane traversed by the knife when cutting, and which I denominate the "cutting-plane" of the knife; and from an examination of the drawings it will be readily seen that the handle C' and arm D may be secured at any desired angle to the knife by means of these ribs and the bolt through the handle C, as may be required to suit the convenience of different operators, or of the same operator when cutting in different positions of a hay-stack. For instance, when cutting on a level with the head of the operator, or above that point, it will ordinarily be found desirable to use the handles in about the position shown; but in cutting on a level with the hips or lower it will sometimes be advantageous to arrange the arm D upon a line substantially coincident with the blade and shank B.

When it is desired to use the blade for cutting cane, corn, or other similar things, the handles can be detached by withdrawing the bolt *c*, the shank B being suitably shaped to form a convenient handle for the blade A when being thus used.

It is well known to farmers that some material is more readily cut by a serrated blade than it is by a smooth-edged blade, and vice versa, for which reason it is desirable that the blade A should be made reversible; and it is also evident from an examination of the drawings that it is practically impossible to use the edge *a'* by inverting the entire implement, from the fact that, in order to use the implement when thus inverted, the operator must change his position relative to the side of the stack which he is cutting, thus necessitating his changing hands with the implement and working left-handed, which would be very awkward. For this reason it is very important that with a knife having the handles C C' and arm D projecting at right angles from the face of the blade, the blade itself should be easily reversible.

What I claim is—

1. In combination with the shank B and the handles projecting at right angles to the cutting-plane of the knife, the reversible blade A, substantially as set forth.

2. In combination with the blade A and shank B, the detachable handles C C' and arm D, substantially as set forth.

3. The combination of the blade A, shank B, provided with radial ribs, arm D, provided with radial ribs, handle C, and bolt c, substantially as set forth.

In testimony that I claim the foregoing as my own I affix my signature in presence of two witnesses.

HENRY FISHER.

Witnesses:
 GEO. W. RAFF,
 O. A. ESSIG.